SIMULTANEOUS MULTIMODE IFF INTERROGATION SYSTEM

Filed Sept. 29, 1964 3 Sheets-Sheet 1

INVENTOR
JOSEPH C. GARDNER

BY Claude Funkhouser
ATTORNEY

Oct. 4, 1966 J. C. GARDNER 3,277,466

SIMULTANEOUS MULTIMODE IFF INTERROGATION SYSTEM

Filed Sept. 29, 1964 3 Sheets-Sheet 2

3,277,466

SIMULTANEOUS MULTIMODE IFF INTERROGATION SYSTEM

Joseph C. Gardner, Andover Estates, Valley Lee, Md.

Filed Sept. 29, 1964, Ser. No. 400,286
5 Claims. (Cl. 343—6.5)

The invention described herein may be manufactured and used by or for the Government of the United States of America for governmental purposes without the payment of any royalties thereon or therefor.

This invention relates to a multimode IFF system and more particularly to a multimode IFF system wherein a large number of modes may be accommodated simultaneously by means of a novel time sharing system.

In present IFF systems, multimode coverage is accomplished by "mode interlace operation" wherein each mode is transmitted and replies are received in sequence, one at a time. The disadvantage of such a system is obvious: for a large number of modes the time available for coverage by each is drastically reduced. For example, with 5 modes, the probability of contacting a target is reduced to one-fifth of that provided by single mode operation.

The present invention overcomes the above objectionable result by providing both a novel time-sharing scheme and novel apparatus to mechanize it. Here, only the time necessary to transmit the actual interrogation code is used sequentially; the travel and response times are shared by all modes. Novel separating circuitry is provided to sort the responses to each mode. In this way, far greater coverage is provided; with five modes and the signal durations chosen as herein, it can be shown that coverage is reduced only about 4 percent from that provided by single mode operation.

It is an object of this invention to provide an improved multimode IFF system.

It is a further object of this invention to provide a new time-sharing scheme for multimode IFF systems.

It is a further object of this invention to provide a new multimode IFF system having substantially greater probability of contact than present multimode IFF systems.

It is a further object of this invention to provide a multimode IFF system having nearly the probability of contact of a single mode IFF system.

It is another object of this invention to provide a multimode IFF system where interrogation signals are sent out sequentially and responses may be returned simultaneously.

Other objects and advantages of the invention will hereinafter become more fully apparent from the following description of the annexed drawings, which illustrate an embodiment of the invention and wherein:

FIGS. 1*a* and 1*b* show the multimode IFF system of the present invention;

FIG. 1*c* shows the placement of FIGS. 1*a* and 1*b*; and

FIGS. 2*a*–2*k* comprise a timing diagram for the novel time-sharing scheme used herein.

*General description*

Referring to FIGS. 1*a* and 1*b*, the novel system is seen to comprise a plurality of mode triggers 10–14, lock-out logic circuitry 15, an encoder 16, suitable radar equipment 17, a plurality of mode separation circuits 18–22, scan conversion circuits 23–27, a decoder 28, and any suitable display system 29. Each IFF mode is independently triggered, and is subject only to control by the lock-out logic to prevent simultaneous attempts by the various mode triggers to control the encoder. It should be noted that each trigger cycle is of different duration. It is for this reason that the substantial increase of coverage afforded by the system is possible. This matter will be further considered when the detailed operation of the system is discussed.

In response to a trigger for a particular mode, the encoder 16 will generate the interrogation code corresponding to that mode. This code will be transmitted and received in the usual manner by the radar equipment 17 and the reply codes will be processed by the mode separation circuits 18–22. These circuits are controlled by the mode trigger and serve to direct the reply codes into the proper reply processing channel for decoding.

Each processing channel may include scan conversion means 23–27, in the event that a standard planned position indicator display is desired, and further includes decoder and display units, such as 28 and 29, respectively. Channel selection switch 30 is provided so that any mode may be monitored. Busses 31 and 32 are also provided so that a plurality of decoders may be used to monitor all modes simultaneously.

*Detailed description*

Figures 1A, 1C:
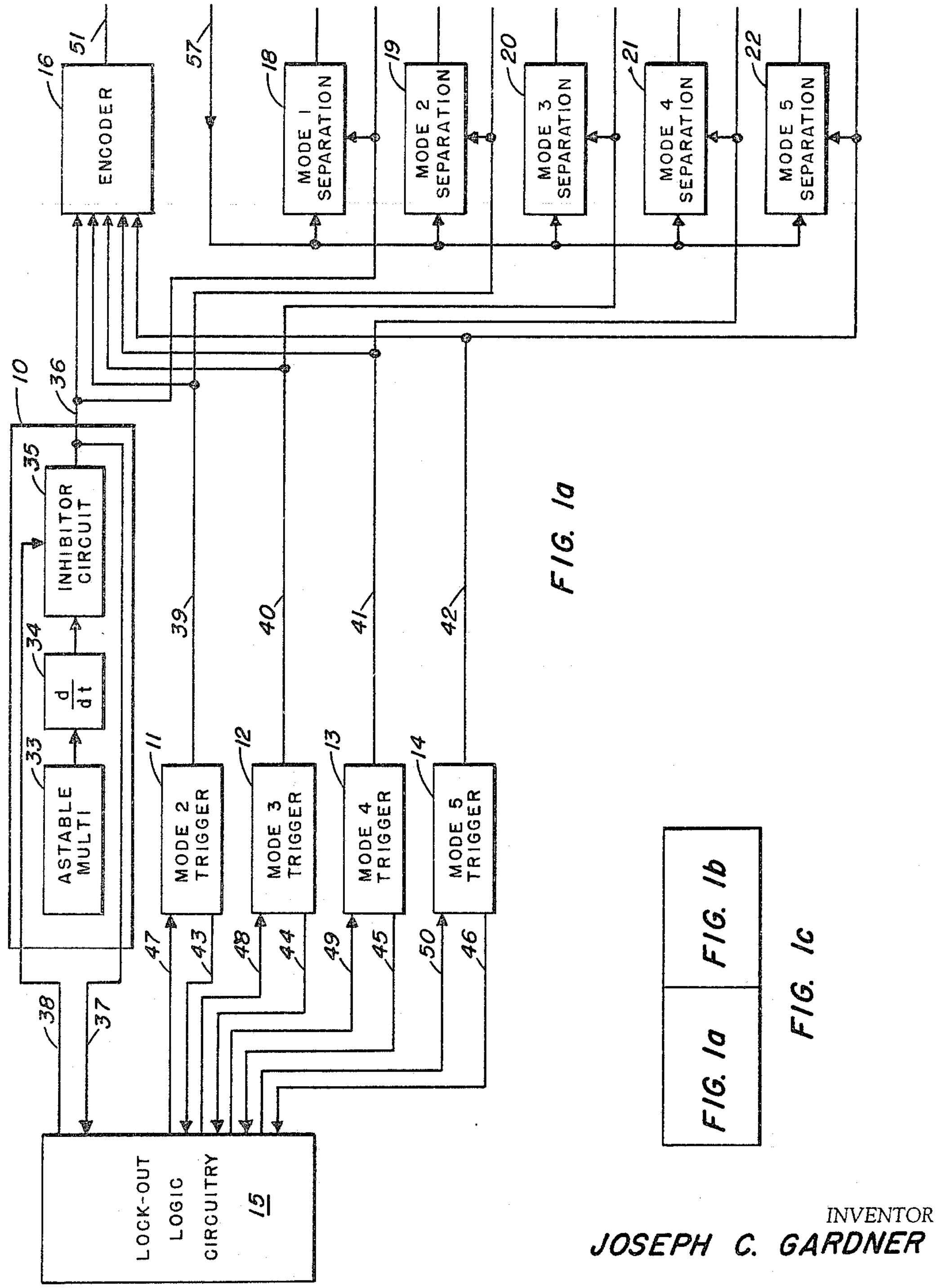

In the preferred embodiment of the present invention each of the five mode triggers 10 through 14 is arranged to provide cycles of trigger pulses. Mode trigger 10 may include an astable multivibrator 33 having a suitable differentiating network 34 connected to its output. Similar circuitry is included in each mode trigger 11 through 14.

Since each triggering period is of different duration and since there is no synchronization between the mode triggers, some means is necessary to prevent the simultaneous activation of more than one mode at a time. To this end, each mode trigger includes an inhibitor circuit such as 35 in mode trigger 10. The output of mode trigger 10 is provided to the rest of the system on lead 36 and to lock-out logic 15 on lead 37. A lock-out signal is provided to inhibitor 35 from the lock-out logic on lead 38. Similarly, output signals from mode triggers 11 through 14 are provided to the system on leads 39–42 and to the lock-out logic on leads 43 through 46. Lock-out signals are provided to mode triggers 11–14 through leads 47–50 from the lock-out logic 15.

Lock-out logic 15 is responsive to an output from any mode trigger circuit to provide lock-out signals to all the other mode trigger circuits. A wide variety of circuit configurations may be used and techniques for designing such are well known to those skilled in the art of logical design. The lock-out logic includes suitable delay circuitry so that the lock-out signals may be of long duration in comparison with the mode trigger signals.

For purposes of explanation, it may be assumed that each interrogation mode consists of a pair of pulses, the separation of which identifies the mode. Accordingly, encoder 16 may comprise a tapped delay line, a chain of monostable multivibrators, or the like. In response to a mode trigger signal on one of lines 36–42 one of the five interrogation codes is provided on lead 51 to IFF interrogator 17.

The interrogator may be of any standard type, and will typically include a modulator transmitter 52, a duplexer 53, an antenna 54, a receiver 55, and a video processor 56, as is well known. The pulse codes returned to the system are made available on lead 57 for further processing by the system.

Since responses to all modes appear on lead 57, mode separation circuits 18 through 22 are provided to sort the replies according to the mode which initiated them. The fact that only one interrogation code is transmitted at a time and that no two trigger cycles are of the same duration makes the sorting process relatively simple.

The mode separation circuit compares every two consecutive cycles for a time coincidence of the reply pulses. Only pulses that are in time coincidence in any two consecutive cycles will be present at the output of the mode separator circuit. Suitable circuitry would include a pair of delay lines, a storage tube operated by the mode trigger, or the like. The period is fixed to provide sufficient time for the interrogation signal to reach a target and for the reply to return from the maximum range over which the system can operate. For example, approximately 2500 microseconds will accommodate a 200 mile interrogation range.

Scan conversion circuits 23 through 27 are provided in the event that it is desired to synchronize the display to a separate radar set 9 rather than to the mode trigger. Trigger signals from the radar 9 are provided over lead 58 to the scan conversion circuits and to contact 59 of switch 60. The outputs of the mode separation circuits are provided at the respective arms of the two position switches 61 through 65. One contact of each switch is connected to inputs 66 through 70 of scan conversion circuits 23 through 27 and the other contact is connected to bypass leads 71 through 75. Switches 61 through 65 will operate in conjunction with switch 60 and the position of these switches will determine if the IFF reply information is to be presented independently or simultaneously with any radar information. Synchro information for a PPI display may be provided by either an IFF or radar antenna over lead 76.

The mode responses will each appear on one of the leads of mode reply bus 32 and the mode trigger signals will appear on the leads of synchronization bus 31. Channel selector switch 30, which is shown as a double pole five position rotary switch, is connected to busses 31 and 32 to provide both a particular mode to decoder 28 and the associated mode trigger to display 29 through contact 77 of switch 60.

For purposes of illustration, it may be assumed that the standard reply code comprising a bracket pulse, a combination of 12 marks and spaces and a second bracket pulse is to be used. Accordingly, a standard decoder of presently used type may be employed as a decoder 28. Similarly, any well known display scheme may be used. As previously noted, other switches such as 30 may be connected to busses 31 and 32 if more than one decoder and display is desired.

Figure 1B:
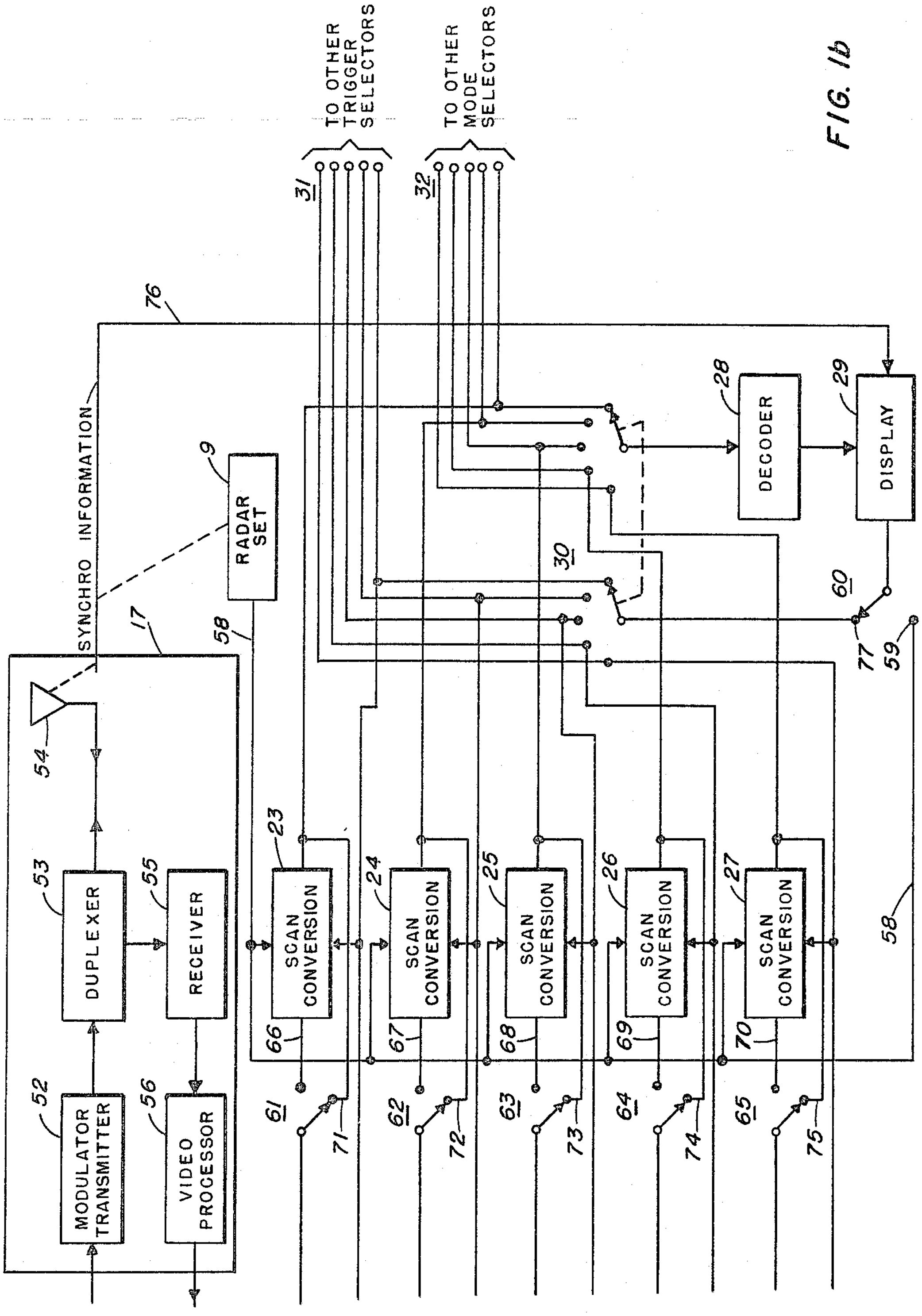
Figure 2:
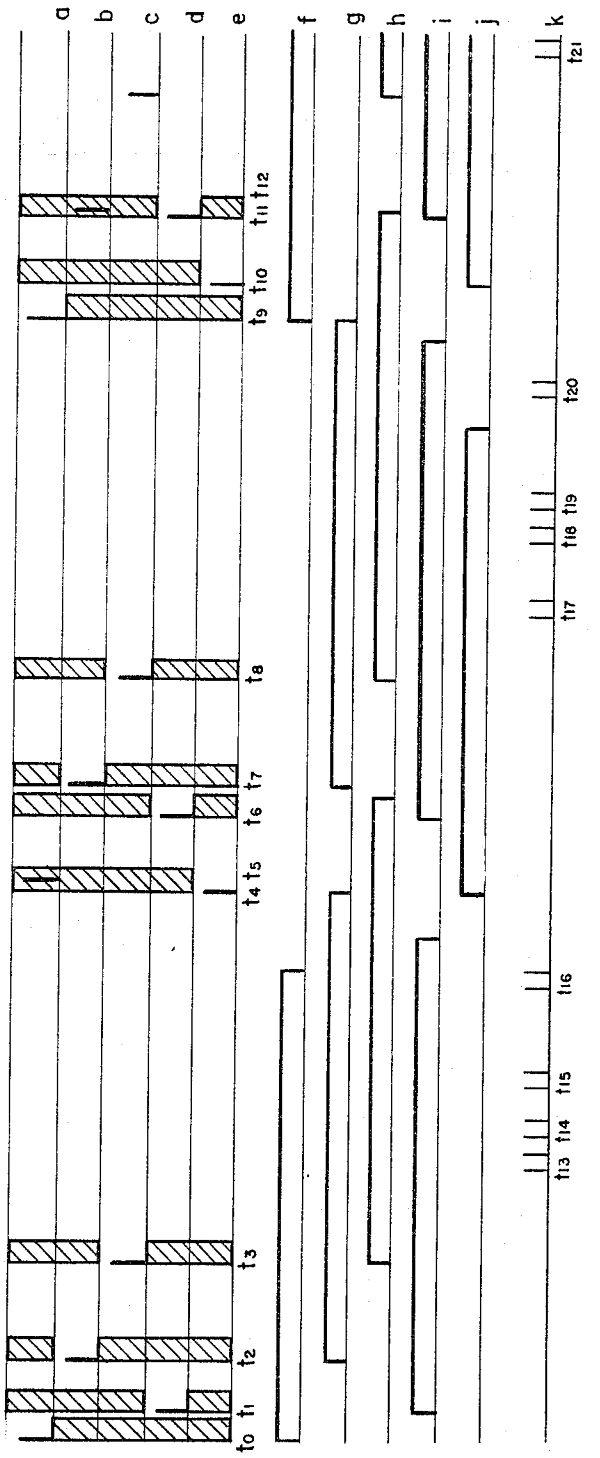

For better understanding of the operation of the system, reference should now be made to both FIGS. 1 and 2. In FIGS. 2*a*–2*e*, the pulses shown represent the trigger signals appearing on lines 36 and 39 through 42 from the mode trigger circuits. As previously mentioned, each trigger period is of different duration. Therefore, the sequence of operation of the mode trigger will not remain fixed. Assume, for example, that at time $t_0$, an output from mode trigger 10 appears on line 36, as shown in FIG. 2*a*. This signal passes to encoder 16 and the message corresponding to mode trigger 10 is generated and transmitted. The cross hatched areas beginning at time $t_0$ are indicative of the lock-out signals appearing on lines 47 through 50 from the lock-out logic 15. Since no trigger signals are generated by mode trigger 11–14 during the lock-out interval, as shown by the absence of pulses in the cross hatched areas, the lock-out signals have no effect. Similarly, the trigger signals generated by mode triggers 13, 11 and 12 at times $t_1$, $t_2$, and $t_3$, respectively, pass to the encoder, and the lock-out signals again have no effect since no further trigger signals are generated during the lock-out intervals.

At time $t_4$ a signal appears on line 42 representative of a mode 5 trigger. At time $t_5$ a signal is generated representative of a mode 1 trigger, but time $t_5$ falls within the lock-out period generated as a result of the pulse at time $t_4$. Therefore, the signal appearing in line 36 at time $t_5$ does not pass to the encoder. At time $t_6$ a pulse appears representative of the mode 4 trigger and at time $t_7$ a similar pulse representative of the mode 2 trigger appears. As can be seen, no further lock-out appears until a signal appears at time $t_{11}$. The trigger signals generated at times $t_6$–$t_{11}$ pass to the encoder since they do not fall within the lock-out times of any prior signals. However, the signal generated at time $t_{12}$, by mode trigger 11 is blocked since the lock-out signal generated at time $t_{11}$ prevents its passage.

The long pulses shown in FIGS. 2*f*–2*j* are representative of the ON times of mode separation circuits 18 through 22.

FIG. 2*k* is an example of the information which might pass from the video processor 56 to and through the mode separators. For purposes of clarity, only the bracket pulses in each reply have been shown, while the intervening marks and spaces have been omitted. For example, at time $t_{13}$, the first of a pair of bracket pulses of a mode 1 reply is shown. Similarly, at time $t_{21}$, the first of a pair of bracket pulses of the reply to the next mode 1 interrogation is shown. It can be seen that the time between $t_0$ and $t_{13}$ is equal to the time between $t_9$ and $t_{21}$; therefore, the mode 1 separation circuit will provide an output for the reply beginning at $t_{21}$. All the remaining replies on line 57, FIG. 2*k*, are not in coincidence with respect to the starting time for consecutive cycles of the mode 1 separator gates; therefore, they will not appear at the output of the mode 1 separator circuit 18. The other four modes will likewise separate their proper replies from all common replies available on line 57. For instance, in FIG. 2*h* it can be seen that $t_{16}$ and $t_{20}$ are both equally delayed from $t_3$ and $t_8$, respectively, while no two other pulse trains are coincident with respect to the start of the mode 3 separator gates.

Assuming that the mode separation circuits are of the storage tube type, time $t_3$ represents the starting time of the first storage (write) cycle of mode 3 separation circuit 20 (corresponding to the first mode 3 interrogation). Time $t_8$ represents the starting time of the second mode 3 storage (read) cycle (the storage tube will read and write simultaneously). It is noted that all reply pulses in FIG. 2*k* are equally delayed from the respective interrogations. In this case, all replies are from one aircraft. Four groups of reply pulses beginning at times $t_{13}$, $t_{14}$, $t_{15}$ and $t_{16}$ and corresponding to interrogation modes 1, 4, 2 and 3, respectively, are available during the first mode 3 cycle and four groups of reply pulses beginning at times $t_{17}$, $t_{18}$, $t_{19}$ and $t_{20}$, and corresponding to interrogation modes 5, 4, 2 and 3 are available during the second mode 3 cycle. The four groups of pulses in this example represent only the replies from one aircraft transponder. Normally, there will be many more replies available on common video line 57. These replies will be from other transponder sets responding to interrogations initiated by interrogator set 17 as well as replies of aircraft transponders intended for other interrogator sets operating in the same general vicinity. However, only the replies of the one particular mode will be present at the output of each mode separator circuit.

It should be remembered that FIGS. 2*a* through 2*k* are not intended to be scale drawings and, therefore, the following point should be noted. The lock-out signals shown in FIGS. 2*a* through 2*e* will not in practice represent as large a portion of the cycle as has been shown. Therefore, the number of interrogation modes which will coincide is even smaller than the number shown in the figures. Similarly, the reply codes do not consume as large a portion of the interrogation cycles as shown and, therefore, the likelihood of interleaved messages is not great; in any event, well known techniques available will overcome this problem if its exists.

In a preferred embodiment of this invention the trigger cycles are approximately 25 microseconds long, and the difference between each cycle is approximately 10 or 15 microseconds. The maximum duration of the interrogation codes is approximately 20 microseconds. Therefore, the lock-out time may be chosen as approximately 25 microseconds to give the transmitter a period of rest. The mode trigger, as indicated, is approximately 2500 microseconds. The reply code duration may be approximately 25 microseconds. With these figures, it can be seen that no practical limitation on the operation of the system of this invention is incurred because of the possibility of infrequent garbling of codes and because of coincidence of interrogation signals. The likelihood of two mode triggers appearing exactly at the same time and therefore locking out both modes is also highly remote.

Thus, it has been shown by the use of the variable duration interrogation cycles, and by the use of the novel system of the present invention, that substantially simultaneous coverage of at least five modes with a multimode IFF system is possible. It should, however, be recognized that a wide variety of interrogation codes, response codes and time allotments may be used without departing from the scope of this invention. Similarly, a wide variety of structure may be used to mechanize the novel method of this invention without departure therefrom. Also, it should be recognized that the type of time assignment employed herein is not limited by any means to a multimode IFF system but rather could be employed to advantage in any interrogator-responder system requiring the monitoring of more than one reply station.

What is claimed is:

1. The method of materially increasing the coverage provided by a multimode IFF system including:
- assigning a different repetition rate to the trigger cycle of each mode;
- assigning a transmission period to each mode from the beginning of each trigger and extending for a predetermined time thereafter;
- establishing a reply time for each mode concurrent with the associated trigger cycle; and
- processing all replies without regard to the identity of the mode to which it is a response.

2. The method of claim 1 wherein the transmission periods are entirely asynchronous.

3. The method of claim 2 wherein no two transmission periods may be initiated simultaneously but wherein replies to all transmission periods may be received simultaneously.

4. A multimode IFF radar system comprising
- a plurality of independently operated free running asynchronous oscillators each having a repetition rate different from that of each of the others, said oscillators serving as mode trigger means;
- coding means responsive to trigger signals from the mode trigger means to generate a different interrogation code for each mode triggered;
- a radar transmitter connected to the coding means to transmit the interrogation codes;
- a radar receiving means for the IFF reply codes;
- a plurality of mode separation means connected in common to the radar receiver, each responsive to a different trigger signal to pass reply code signals for a predetermined period commencing with the reception of the trigger signal; and
- means to connect the output of each mode separation means to a decoder for verification of the IFF reply codes.

5. In a system for transmitting a plurality of messages and receiving and processing replies thereto, the combination of
- a plurality of asynchronous trigger means, one for each message to be transmitted, each triggering means generating recurring trigger pulses independent of all other triggering means, the repetition rate of each triggering means being different from that of every other triggering means;
- a message generator responsive to signals from the triggering means to generate the messages corresponding to the signals received;
- means to transmit the messages;
- means to receive replies thereto;
- means to process the replies including a plurality of separation means, all connected to the receiving means, and each responsive to a signal from one of the triggering means to pass all replies received during a predetermined interval commencing with the arrival of the trigger signal; and
- lock-out means connected to each triggering means responsive to a signal from one triggering means to block passage of the other trigger signals to the message generator and processing means for a predetermined period thereafter.

References Cited by the Examiner

UNITED STATES PATENTS 3,058,104 10/1962 Garfinkel et al. -------- 343—6.5

CHESTER L. JUSTUS, *Primary Examiner.*

LEWIS H. MYERS, *Examiner.*

P. M. HINDERSTEIN, *Assistant Examiner.*